United States Patent

Murakami et al.

Patent Number: 5,413,643
Date of Patent: May 9, 1995

[54] ROLLING BEARING

[75] Inventors: Yasuo Murakami; Kazuo Sekino; Nobuaki Mitamura, all of Kanagawa, Japan

[73] Assignee: NSK Ltd., Tokyo, Japan

[21] Appl. No.: 242,668

[22] Filed: May 13, 1994

[30] Foreign Application Priority Data

May 13, 1993 [JP] Japan .................. 5-111950

[51] Int. Cl.⁶ .................. C22C 38/18; C21D 9/36
[52] U.S. Cl. .................. 148/319; 148/906; 148/333; 384/912
[58] Field of Search .................. 148/906, 319, 333; 384/912

[56] References Cited

U.S. PATENT DOCUMENTS

| | | | |
|---|---|---|---|
| 4,904,094 | 2/1990 | Furumura et al. | 384/492 |
| 4,992,111 | 2/1991 | Yamada et al. | 148/906 |
| 5,085,733 | 2/1992 | Mitamura | 148/906 |
| 5,338,377 | 8/1994 | Mitamura | 148/906 |

FOREIGN PATENT DOCUMENTS

| | | |
|---|---|---|
| 1428029 | 4/1973 | United Kingdom . |
| 2235698 | 8/1990 | United Kingdom . |
| 2272909 | 11/1993 | United Kingdom . |

*Primary Examiner*—Deborah Yee
*Attorney, Agent, or Firm*—Sughrue, Mion, Zinn, Macpeak & Seas

[57] ABSTRACT

A rolling bearing is disclosed, which comprises an inner ring, an outer ring, and rolling elements each composed of an alloy steel which are, after being subjected to a carburizing treatment or a carbonitriding treatment, subjected to quench-hardening and tempering or is subjected to quench-hardening or tempering, wherein the alloy steel contains from 0.10 to 1.00% by weight C, from 0.50 to 3.00% by weight Cr, from 0.15 to 1.00% by weight Si, from 0.2 to 1.50% by weight Mn, and rest being Fe and unavoidably intermixed impurities, the average amount of the retained austenite of at least the inner ring in the inner ring and the outer ring is not more than 4% by volume and the average amount of the retained austenite of the rolling elements is from 20 to 30% by volume.

5 Claims, 4 Drawing Sheets

FIG. 1
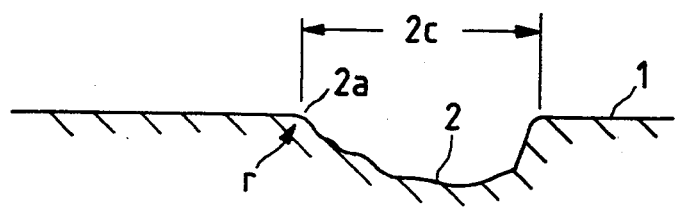
FIG. 2(a)   FIG. 2(b)   FIG. 2(c)
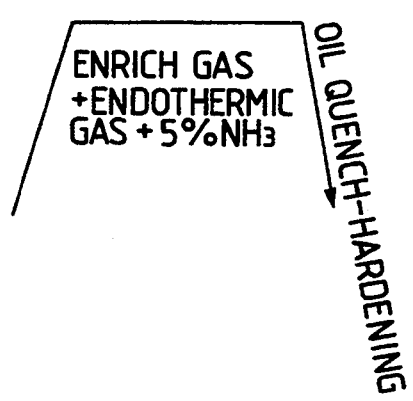
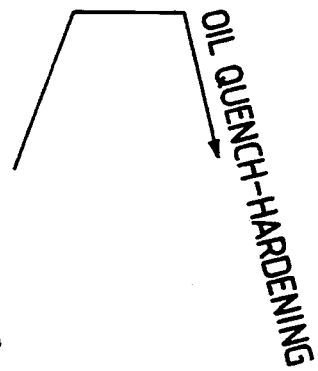

860–880°C × 30 MIN.

160–180°C × 100 MIN.

ROLLING BEARING

FIELD OF THE INVENTION

The present invention relates to a rolling bearing being used for motorcars, agricultural implements and machineries, construction machineries, iron and steel machineries, etc., and more particularly, to a rolling bearing capable of maintaining a good dimensional stability and a long rolling life at a high temperature and under a foreign matter-intermixed lubrication (the state that foreign matters are intermixed in a lubricant in the bearing) and being suitably used for transmissions and engines.

BACKGROUND OF THE INVENTION

As one of the factors of lowering the life of a rolling bearing, there is, for example, a factor that foreign matters (chips of a metal, flashes., abraded powders, etc.) are intermixed in a lubricant supplied in the bearing and these foreign matters give damages to the inner ring, the outer ring, and the rolling elements when the bearing is moved. Also, when foreign matters are intermixed in the lubricant in a bearing, it sometimes happens that the life of the bearing is shortened to about 1/10 of that of a bearing in the case that the lubricant in the bearing scarcely contains such foreign matters.

For improving lowering of the life of a bearing caused by intermixing of such foreign matters in the lubricant in the bearing, it is disclosed in JP-A-64-55423 (the term "JP-A" as used herein means an "unexamined published Japanese patent application") that the amount of carbon of an alloy steel forming the inner ring, the outer ring, and the rolling elements and the amount of the retained austenite of the surface layer of each member are limited to the definite ranges.

On the other hand, recently, since a bearing incorporated in a transmission or an engine become a high temperature (about 130° to 170° C.) with the increase of the output of an engine, a bearing having a high rolling life at a high temperature has been demanded.

As a bearing having a high rolling life at such a high temperature, JP-A-3-82736 discloses the bearing wherein at least one of the inner ring, the outer ring, and the rolling elements is formed by an alloy steel prepared by adding the elements such as Si, Cr, Mo, V, etc., to a low- or middle-carbon steel and after applying thereto a carburizing treatment or a carbonitriding treatment, the member(s) are quench-hardened and tempered at a high temperature to reduce the average amount of the retained austenite below 3%.

When the inner ring, the outer ring, and/or the rolling elements are tempered at a high temperature for improving the dimensional stability at a high temperature, the hardness thereof is generally lowered but since in the bearing disclosed in foregoing JP-A-3-82736, Si, Cr, Mo, V, etc., are added to the low- or middle-carbon steel, the reduction of the hardness by such high-temperature tempering is restrained. Also, after applying a carburizing treatment or a carbonitriding treatment, quench-hardening, and tempering, the carbides of Cr, Mo, and V exist in the surface layer portion of the alloy steel, whereby the surface layer portion of the inner ring, the outer ring, and/or the rolling elements can be hardened. Thus, the abrasion resistance of each member at a high temperature is improved, whereby the rolling life of the bearing is increased.

Also, JP-A-3-153842 discloses a bearing wherein at least one of the inner ring, the outer ring, and the rolling elements is formed by an alloy steel prepared by adding the elements such as Si, Cr, Mn, (Mo), etc., to a middle-carbon steel and after applying thereto a carbonitriding treatment, each member is quench-hardened and tempered at a high temperature. By this treatment, the reduction of the hardness by high-temperature tempering is restrained and the abrasion resistance of each member at a high temperature is improved, thereby a bearing having a high rolling life is obtained.

However, in the conventional techniques described above, the technique disclosed in JP-A-64-55423 aims at the inhibition of lowering the life of the bearing by intermixing of foreign matters in the lubricant in the bearing and the techniques disclosed in JP-A-3-82736 and JP-A-3-153842 aim at the improvement of the rolling life of the bearing at a high temperature but these techniques do not consider the case of using a rolling bearing at a high temperature and in the state of containing the lubricant intermixed with foreign matters.

SUMMARY OF THE INVENTION

The present invention relates to an improvement of these conventional techniques and the object of the present invention is to provide a rolling bearing capable of maintaining both the good dimensional stability and a long rolling life under the conditions of a high temperature and of the state of intermixing foreign matters in the lubricant in the bearing.

It has now been discovered that the object described above can be attained by the present invention as described hereinbelow.

That is, according to the present invention, there is provided a rolling bearing comprising an inner ring, an outer ring, and rolling elements each composed of an alloy steel which are, after being subjected to a carburizing treatment or a carbonitriding treatment, subjected to quench-hardening and tempering or are subjected to quench-hardening and tempering, wherein said alloy steel contains from 0.10 to 1.00% by weight C, from 0.50 to 3,00% by weight Cr, from 0.15 to 1.00% by weight Si, from 0.20 to 1.50% by weight Mn, and rest being Fe and unavoidably intermixed impurities, the average amount of the retained austenite of at least the inner ring in the inner ring and the outer ring is not more than 4% by volume, and the average amount of the retained austenite of the rolling elements is from 20 to 30% by volume.

In a preferred embodiment, at least the inner ring in the inner ring and the outer ring contains from 0.10 to 0.80% by weight C and at least said inner ring in the inner ring and the outer ring is, after being subjected to a carburizing treatment or a carbonitriding treatment, subjected to quench-hardening and high-temperature tempering (at about 220° to 240° C.).

In another preferred embodiment, the rolling elements contain 0.80 to 1.00% by weight C and said rolling elements are subjected to quench-hardening and tempering (at about 160° to 180° C.).

BRIEF DESCRIPTION OF THE DRAWINGS

FIG. 1 is an enlarged partial cross sectional view explaining the action of the present invention, FIGS. 2(a), 2(b) and 2(c) are graphs each showing the conditions of the carbonitriding treatment, quench-hardening, and high-temperature tempering applied to steel A in the examples of the present invention.

DETAILED DESCRIPTION OF THE INVENTION

Figure 3B:
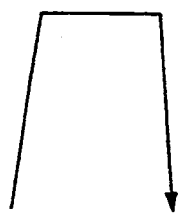
FIGS. 3(b) and 3(c) are graphs each showing the conditions of quench-hardening and tempering applied to steel B in the examples of the present invention.

In the present invention, the average amount of the retained austenite is a value obtained by dividing the total amount of the retained austenite in from the surface portion to the core portion of the member (i.e., not only the surface portion of the members) by the total volume of the member.

In cases where an alloy steel used in the present invention contains less than 0.80% by weight C, it is preferred that after being subjected to a carburizing treatment or a carbonitriding treatment, the alloy is subjected to quench-hardening and high-temperature tempering.

In the present invention, as the alloy steel for forming the inner ring, the outer ring, and the rolling elements constituting the rolling bearing, the alloy steel containing from 0.10 to 1.00% by weight C, from 0.50 to 3.00% by weight Cr, from 0.15 to 1.00% by weight Si, and from 0.20 to 1.50% by weight Mn is used and the reason is as follows.

<C: 0.10 to 1.00% by weight>

The content of C is same as the carbon content of a case hardening steel or a bearing steel which is an ordinary bearing material. If the content of C is less than 0.10% by weight, the time required for the carburizing treatment or the carbonitriding treatment is prolonged. On the other hand, if the content of C is over 1.00% by weight, large carbides are formed in the surface layer portion.

With respect to at least the inner ring, it is preferred to have the carbon content of 0.10 to 0.80% by weight, whereby the average amount, of the retained austenite is effectively controlled, the dimensional stability at a high temperature is improved, and the pressed-in state of the bearing to the shaft is maintained, and the creep is inhibited.

With respect to the rolling elements, it is preferred to have the carbon content of 0.80 to 1.00% by weight, whereby the retained austenite amount in the surface layer portion is increased by a heat treatment with ease and low cost. In addition, the retained austenite amount is nearly uniform inside thereof, it is easily controlled.

<Cr: 0.50 to 3.00% by weight>

By the existence of Cr in the foregoing amount, large amounts of carbides, carbonitrides, and chromium nitrides can be deposited and also these particle sizes can be fined. If the content of Cr is less than 0.50% by weight, the carbides are liable to become large at the carburizing treatment or the carbonitriding treatment. On the other hand, if the content of Cr is over 3.00% by weight, the Cr oxide is formed at the surface and carbon and nitrogen become reluctant to enter the member, whereby the carburizing or carbonitriding characteristics are lowered.

<Si: 0.15 to 1.00% by weight>

By the existence of Si in the foregoing amount, the mechanical property and the heat-treatment characteristics of each member are improved. If the content of Si is less than 0.15% by weight, the toughness of the core portion of each member is lowered, while if the content of Si is over 1.00% by weight, carbon and nitrogen are, become reluctant to enter the surface of each member to lower the carburizing or carbonitriding characteristics.

<Mn: 0.20 to 1.50% by weight>

By the existence of Mn in the foregoing amount, the quench-hardening property of each member is improved, whereby the toughness after quench-hardening is increased. If the content of Mn is less than 0.20% by weight, the action of Mn is insufficient, while if the content of Mn is over 1.50% by weight, the machinability and the hot workability of the alloy steel are lowered.

In addition to the factors described above, in the present invention, in the rolling rings and the rolling elements constituting the rolling bearing, the average amount of the retained austenite is limited with respect to at least the inner ring of the rolling rings and the rolling elements. In the retained austenite, the formation of martensite proceeds with the passage of time., whereby the alloy steel containing the retained austenite causes a dimensional change with the passage of time. Accordingly, when an alloy steel containing a large amount of the retained austenite is used at a high temperature, the decomposition of the retained austenite (the formation of martensite) is accelerated to increase the amount of the dimensional change formed.

Thus, the experiment of keeping alloy steels each containing a different initial amount of the retained austenite at a definite temperature for a definite time was carried out and each decomposed amount of the retained austenite was calculated by following formulae (1) and (2) relative to the decomposed amount of the restrained austenite.

$$\Delta\gamma_R = \gamma_{RO}(1 - e^{-Kt}) \quad (1)$$

$\Delta\gamma_R$: Decomposed amount of retained austenite
$\gamma_{RO}$: Initial average amount of retained austenite
t: Retention time
K: Decomposition rate constant of austenite.

$$\log K = A - (B/T) \quad (2)$$

A, B: Constants determined by the chemical composition of each alloy steel
T: Retention temperature.

As the results thereof, when the chemical composition of the alloy steel being used was 0.10 to 1.00% by weight C, from 0.50 to 3.00% by weight Cr, from 0.15 to 1.00% by weight Si, and from 0.20 to 1.50% by weight Mn, the initial average amount of the retained austenite capable of reducing the decomposed amount of the retained austenite below a definite value was not more than 4% by volume, preferably 2 to 4% by volume, for the inner ring the outer ring and from 20 to 30% by volume, preferably 25 to 30% by volume, for the rolling elements.

On the other hand, as shown in foregoing JP-A-64-55423, when a rolling bearing is used under a lubrication intermixed with foreign matters, as shown in FIG. 1 as an enlarged cross sectional view, an impression is formed at the surface 2 of the track surface 1 of the bearing by the repeated contact with the foreign matters, the stress is concentrated to the edge portion 2a of the impression surface 2, and a micro crack spreads to the circumference from the edge portion. Also, as the ratio of the curvature r of the edge portion 2a to the radius c of the impression 2 (r/c) is larger, the concentration of the stress at the edge portion 2a can be more relaxed.

Now, from the result of determining the relation of the value of (r/c) and the amount of the retained austenite (see FIG. 5 of JP-A-64-55423), since when the amount of the retained austenite is less than 45% by volume, the value of (r/c) becomes larger with the increase of the amount of the retained austenite, by increasing the amount of the retained austenite to increase the value of (r/c), the concentration of the stress at the edge portion 2a is relaxed and thus the impression damage formed at the track surface 1 can be reduced. Also, practically, it is disclosed that when the amount of the retained austenite at the surface layer portion is in the range of from 20 to 45% by volume, the rolling life of the bearing in the lubricant intermixed with foreign matters can be prolonged.

However, in cases where a rolling bearing is used under a lubrication intermixed with foreign matters and a high temperature, if the average amount of the retained austenite is increased as discussed above, it causes the increase of the inner diameter of the rolling bearing due to insufficient dimensional stability and any inconveniences due to the decrease of the internal clearance (the former involves, e.g., the shortage of the fitting interference of an inner ring and a shaft and the latter involves, e.g., the locking of a rolling bearing).

By synthesizing the foregoing matters and considering that the dimensional change of bearing rings, in particular, the inner ring is strictly restrained, in the rolling bearing of the present invention, the average amount of the retained austenite of at least the inner ring of the bearing rings is reduced below 4% by volume and the average amount of the retained austenite of the rolling elements of the rolling bearing is increased to the amount of from 20 to 30% by volume, whereby even when the rolling bearing of the present invention is used in the state that foreign matters are intermixed between the bearing rings and rolling elements, the impression damage formed at the bearing rings can be reduced and also the dimensional change thereof in the use at a high temperature can be reduced.

It is preferred that the alloy steels for forming the inner ring, the outer ring, and the rolling elements of the bearing of the present invention contain Mo in an amount of not more than 2.00% by weight (the lower limit thereof is preferably 0.08% by weight) and Ni in an amount of not more than 1.00% by weight (the lower limit thereof is preferably 0.08% by weight). That is, by containing Mo, the quench-hardening property is accelerated to increase the toughness of the alloy steel but if the content of Mo is over 2.00% by weight, the grain sizes of the carbide formed in the surface layer portion become larger. Also, by containing Ni, the quench-hardened texture is homogenized to improve the shock resistance of the alloy steel but the incorporation of Ni over 1.00% by weight is uneconomical and it is more economical to increase the contents of C, Si, Mn, and Cr instead thereof.

If Mo or Ni is contained in an amount of 0.08% by weight as a lower limit, it provides their effects in some degree. Depending on the purpose, a desired effect can be improved by adjusting the amounts thereof within the above range.

Furthermore, in the rolling bearing of the present invention, it is preferred that the amount of the retained austenite in the surface layer portion of the rolling elements is from 20 to 45% by volume since in this case, the life of the bearing under the lubricant intermixed with foreign matters is prolonged. In addition, the surface layer portion is obtained by the calculation from the contact pressure applied to the contact surface of the track surface and if the maximum shearing stress portion (the depth from the surface) is $Z_o$, the surface layer portion is the portion of from the surface to the depth of from $Z_o$ to $2Z_o$, for example, the portion from the surface to the depth of from about 0.2 to 0.5 mm.

Then, the present invention is described in detail by the following non-limiting examples.

EXAMPLES

Figure 3C:

The inner ring, the outer ring, and the rolling elements of a rolling bearing were formed with steel A (C content: 0.42% by weight) or steel B (C content: 0.96% by weight) having the composition shown in Table 1 below, those obtained using the steel A were subjected to the carbonitriding treatment (a), quench-hardening (b), and high-temperature tempering (c) as shown in FIGS. 2(a), 2(b) and 2(c) and those obtained using the steel B were subjected to quench-hardening (b) and tempering (c) as shown in FIGS. 3(b) and 3(c).

TABLE 1

| | Content (wt %, however, Ti and O are by ppm) | | | | | | | | | |
|---|---|---|---|---|---|---|---|---|---|---|
| | C | Si | Mn | P | S | Ni | Cr | Mo | Cu | Ti | O |
| A: | 0.42 | 0.41 | 0.77 | 0.012 | 0.007 | 0.08 | 1.53 | 0.90 | 0.11 | 30 | 7 |
| B: | 0.96 | 0.43 | 1.31 | 0.011 | 0.008 | 0.08 | 1.25 | 0.08 | 0.08 | 30 | 8 |

A: Steel A, B: Steel B

Also, the inner ring, the outer ring, and the rolling elements of a rolling bearing were formed with SUJ2, and each member was subjected to quench-hardening (heating temperature 840° C., heating time 30 minutes, oil quench-hardening) and tempering (heating temperature 160° C., heating time 100 minutes). Furthermore, rolling elements were formed with SUJ2 and were subjected to quench-hardening (heating temperature 950° C., heating time 30 minutes, oil quench-hardening) and tempering (heating temperature 160° C., heating time 100 minutes). The high-temperature quench-hardened product was indicated as SUJ2*. Also, an inner ring was formed with SUJ2 and was subjected to quench-hardening (heating temperature 840° C., heating time 30 minutes, oil quench-hardening) and high-temperature tempering (heating temperature 230° C., heating time 100 minutes). The high-temperature tempered product was indicated as SUJ2**.

Figure 4:
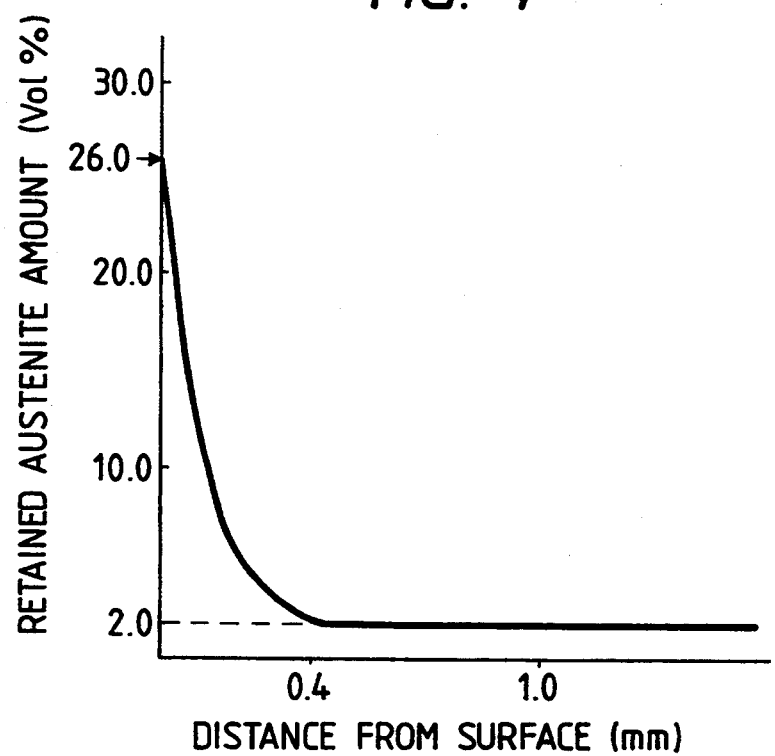
FIG. 4 is a graph showing the distribution of the retained austenite amount of the inner ring obtained by applying the carbonitriding treatment, quench-hardening, and high-temperature tempering to steel A.

In addition, the distribution of the amount of retained austenite of the inner ring formed with the steel A, which was subjected to the carbonitriding treatment, quench-hardening, and high-temperature tempering as described above, is shown in the graph of FIG. 4. From the graph, it can be seen that the amount of the retained austenite in the surface layer portion of the inner ring is 26.0% by volume and the amount of the retained austenite is suddenly reduced as approaching the core portion to the distance of 0.4 mm from the surface thereof and is saturated at about 2.0% by volume from the position toward the center of the core. Also, the value of the total amount of the retained austenite divided by the volume of the inner ring (the average amount of the retained austenite) is 4% by volume.

Also, with respect to the outer ring and the rolling elements formed with the steel A, which were subjected to the carbonitriding treatment, quench-hardening, and high-temperature tempering, the average amount of the retained austenite was calculated by the same manner as described above.

Furthermore, with respect to the inner ring, the outer ring, and rolling elements formed with the steel B or SUJ 2, the rolling elements formed with SUJ2*, and the inner ring formed with SUJ2**, the average amount of the retained austenite was calculated by the same manner as described above. Since these members were not subjected to the carbonitriding treatment, the amount of the retained austenite was almost constant in the depth direction and the amount of the retained austenite at the surface layer portion became almost same as the average amount of the retained austenite.

Also, on each member of each bearing, the Vickers hardness $H_v$ was measured.

The inner rings, the outer rings, and the rolling elements thus obtained were each combined as shown in Table 2 and Table 3 below were assembled to form the single-row deep-groove ball bearings of Examples 1 to 4 and Comparison Examples 1 to 7. The outside diameter of the bearing was 62 mm, the inside diameter thereof was 30 mm, and the width thereof was 16 mm.

Dimensional Stability Test

On each of the bearings of Examples 1, 3 and 4 and Comparison Examples 1, 2 and 7 assembled by the combinations shown in Table 2 below, a test of determining the dimensional stability at 170° C. was carried out.

Specifically, when each bearing wherein the radial internal clearance (hereinafter, is referred to as simply "internal clearance") was 31 μm was pressed in a shaft having a diameter of 30 mm with an interference of 17 μm, the internal gap after pressed in was 18 μm. Then, after placing each shaft having pressed therein the bearing was placed in a tempering furnace and maintained therein for 1,000 hours at 170° C., the pressed-in state of each bearing to the shaft was determined. Also, after the test, each bearing was overhauled and the inside diameter of the inner ring and the internal clearance were measured.

The results are shown in Table 2 below.

TABLE 2

|  |  |  | Mean $\gamma_R$ (vol %) | Surface Hardness ($H_v$) | Inside Diameter (μm) | Internal Clearance (μm) |
|---|---|---|---|---|---|---|
| Ex. 1: | I.R. | A | 4 | 742 |  |  |
|  | O.R. | A | 3 | 750 | −4 | 11 |
|  | R.E. | B | 25 | 782 | (OK) |  |
| Ex. 3: | I.R. | A | 4 | 743 |  |  |
|  | O.R. | A | 3 | 751 | −5 | 13 |

TABLE 2-continued

|  |  |  | Mean $\gamma_R$ (vol %) | Surface Hardness ($H_v$) | Inside Diameter (μm) | Internal Clearance (μm) |
|---|---|---|---|---|---|---|
|  | R.E. | B | 20 | 780 | (OK) |  |
| Ex. 4: | I.R. | A | 2 | 750 |  |  |
|  | O.R. | A | 2 | 751 | −7 | 8 |
|  | R.E. | B | 30 | 720 | (OK) |  |
| Comp. Ex. 1: | I.R. | SUJ2 | 11 | 754 |  |  |
|  | O.R. | SUJ2 | 10 | 752 | +16 | 28 |
|  | R.E. | SUJ2 | 10 | 776 | (slip out) |  |
| Comp. Ex. 2: | I.R. | A | 4 | 742 |  |  |
|  | O.R. | A | 3 | 750 | −4 | 0 |
|  | R.E. | SUJ2* | 34 | 701 | (OK) | (a) |
| Comp. Ex. 7: | I.R. | A | 5 | 740 |  |  |
|  | O.R. | A | 5 | 742 | −1 | 0 |
|  | R.E. | SUJ2* | 30 | 720 |  |  |

In the above table:
I.R.: Inner ring
O.R.: Outer ring
R.E.: Rolling elements
A: Steel A
B: Steel B
(a): Preloaded state In the bearings of Examples 1, 3 and 4 and Comparison Examples 2 and 7, the pressed-in state was maintained (but it was not sufficient in Comparison Example 7 as discussed below) but in the bearing of Comparison Example 1, the inside diameter was increased to lose the interference, whereby the bearing was in the state that the bearing was easily slipped out from the shaft.

Also, as seen from the results shown in Table 2, in the bearing of Example 1, the internal clearance was reduced by 20 μm but the effective interference was maintained. In the bearing of Comparison Example 1, the internal clearance was scarcely changed but in the bearing of Comparison Example 2, since the average austenite amount of the rolling elements was over 30% by volume and it was inferior in the dimensional stability (the swelling amount became large), the internal clearance was reduced to 0 μm and the internal clearance became negative in the pressed-in state, whereby an inconvenience would occur.

In summary, it was turned out that when the average amount of the retained austenite of the inner ring was not more than 4% by volume, satisfactory interference was maintained after testing, moreover, when the average amount of the retained austenite of the rolling elements was not more than 30% by volume, the internal clearance was sufficiently remained.

Life Test

On each of the bearings of Examples 1 to 4 and Comparison Examples 2 to 7 assembled by the combinations as shown in Table 3 below, the $L_{10}$ life under the lubricant intermixed with foreign matters was measured using the ball bearing life test machine, manufactured by NSK Ltd. under the following conditions.

Intermixed Foreign Matters:
  Cementite series particles $H_v$:540 Diameter:74 to 147 μm Intermixed amount: 1,000 ppm.
Lubricant Oil: Turbine Oil (FBK Oil RO150, made by Nippon Oil Co., Ltd.)
Load Condition: P(charged load)/C(dynamic load ratings)=32
Bearing Rotation Number: 4,900 r.p.m.
Test Temperature: 170° C.

Thus, the life test was applied to 10 bearings of each kind and by the Weibull distribution function, the total rotation time until flaking occurred in the bearing of 10% from the short life side was determined, which was defined as the life ($L_{10}$).

The results are shown in Table 3 below.

TABLE 3

|  |  |  | Mean $\gamma_R$ (vol %) | Surface Hardness ($H_v$) | Life (hour) |
|---|---|---|---|---|---|
| Ex. 1: | I.R. | A | 4 | 742 |  |
|  | O.R. | A | 3 | 750 | 88 |
|  | R.E. | B | 25 | 782 |  |
| Ex. 2: | I.R. | A | 4 | 742 |  |
|  | O.R. | B | 28 | 774 | 94 |
|  | R.E. | B | 25 | 782 |  |
| Ex. 3: | I.R. | A | 4 | 743 |  |
|  | O.R. | A | 3 | 751 | 83 |
|  | R.E. | B | 20 | 780 |  |
| Ex. 4: | I.R. | A | 2 | 750 |  |
|  | O.R. | A | 2 | 751 | 85 |
|  | R.E. | B | 30 | 720 |  |
| Comp. Ex. 2: | I.R. | A | 4 | 742 |  |
|  | O.R. | A | 3 | 750 | 72 |
|  | R.E. | SUJ2* | 34 | 701 | (locked)*1 |
| Comp. Ex. 3: | I.R. | SUJ2** | 2 | 695 |  |
|  | O.R. | SUJ2 | 10 | 752 | 26 |
|  | R.E. | SUJ2 | 10 | 776 |  |
| Comp. Ex. 4: | I.R. | A | 4 | 742 |  |
|  | O.R. | A | 3 | 750 | 33 |
|  | R.E. | SUJ2 | 10 | 776 |  |
| Comp. Ex. 5: | I.R. | A | 4 | 742 |  |
|  | O.R. | B | 28 | 774 | 51 |
|  | R.E. | A | 3 | 756 |  |
| Comp. Ex. 6: | I.R. | A | 4 | 742 |  |
|  | O.R. | A | 3 | 750 | 46 |
|  | R.E. | A | 3 | 756 |  |
| Comp. Ex. 7: | I.R. | A | 5 | 740 |  |
|  | O.R. | A | 5 | 742 | 80 |
|  | R.E. | SUJ2* | 30 | 720 |  |

In Table 3:
I.R.: Inner ring
O.R.: Outer ring
R.E.: Rolling elements
*1Locked by the damage of the retainer As is clear from the results shown in Table 3 above, it can be seen that the life of each of the bearings of Examples 1 to 4 are greatly longer than the life of each of the bearings of Comparison Examples 2 to 7.

On the other hand, in Comparison Example 2, since the average amount of the retained austenite of the rolling elements was over 30% by volume, the internal clearance of the rolling bearing was lost, so it was not able to rotate smoothly, which brought about the damage of the retainer and the locking of the rolling bearing. In addition, in Comparison Examples 3 to 6, since the retained austenite amount of the rolling elements was lower than 20% by volume, the r/c value became low, then the concentration of the stress at edge portion of the impression was not sufficiently relaxed, the rolling life was shortened at a high temperature under a lubrication intermixed with foreign matters. Furthermore, in Comparison Example 7, since the average amount of the retained austenite of the inner ring was 5% by volume, which is over 4% by volume, the inner diameter of the inner ring was significantly increased, the remained interference of 1 μm between the inner ring and the shaft was not sufficient, then a slip was brought about between them, which is so-called creep, whereby vibration became large to stop the rotation.

Figure 5:
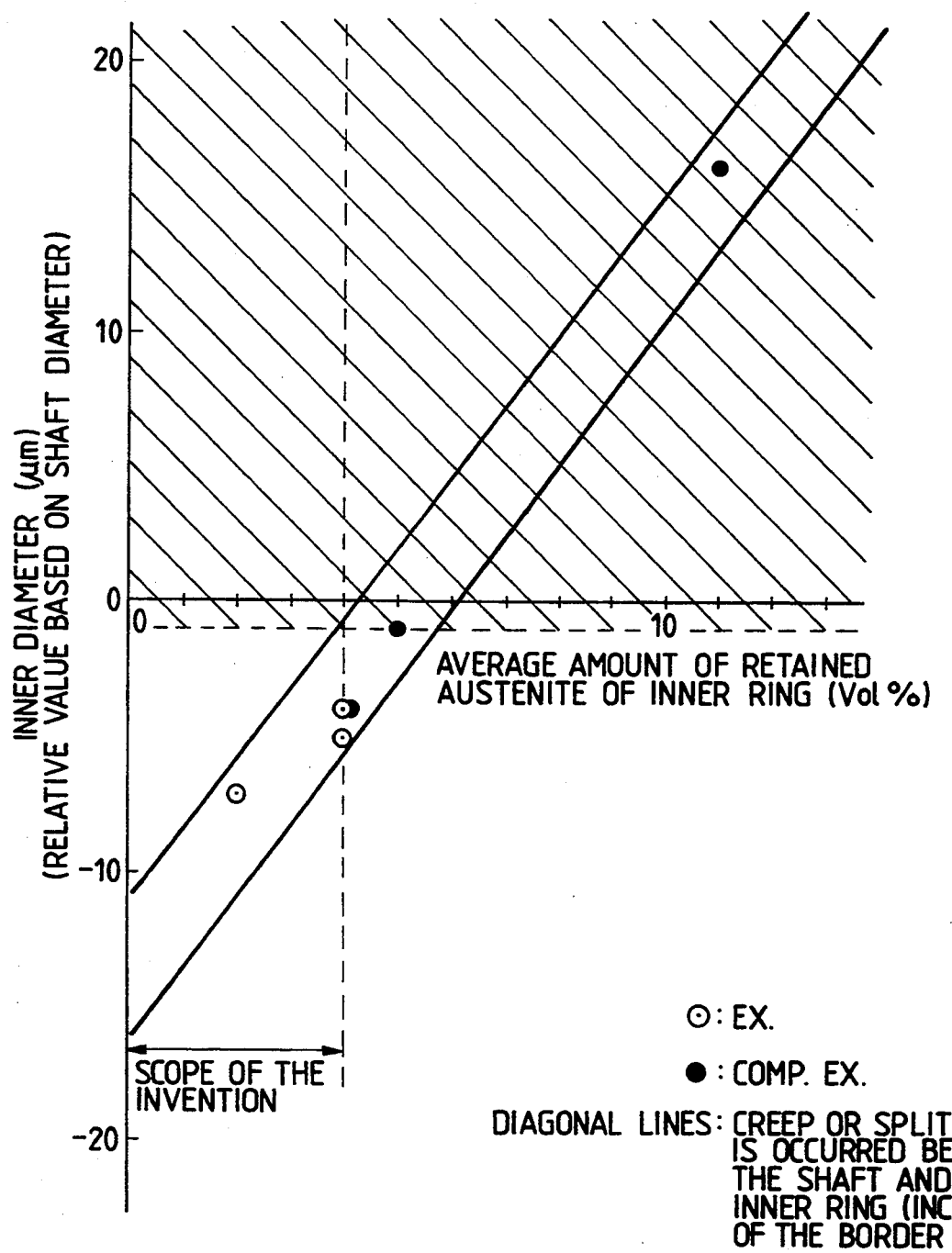
FIG. 5 is a graph showing a relationship of the average amount of the retained austenite of the inner ring with the inner diameter in the examples of the present invention.
Figure 6:
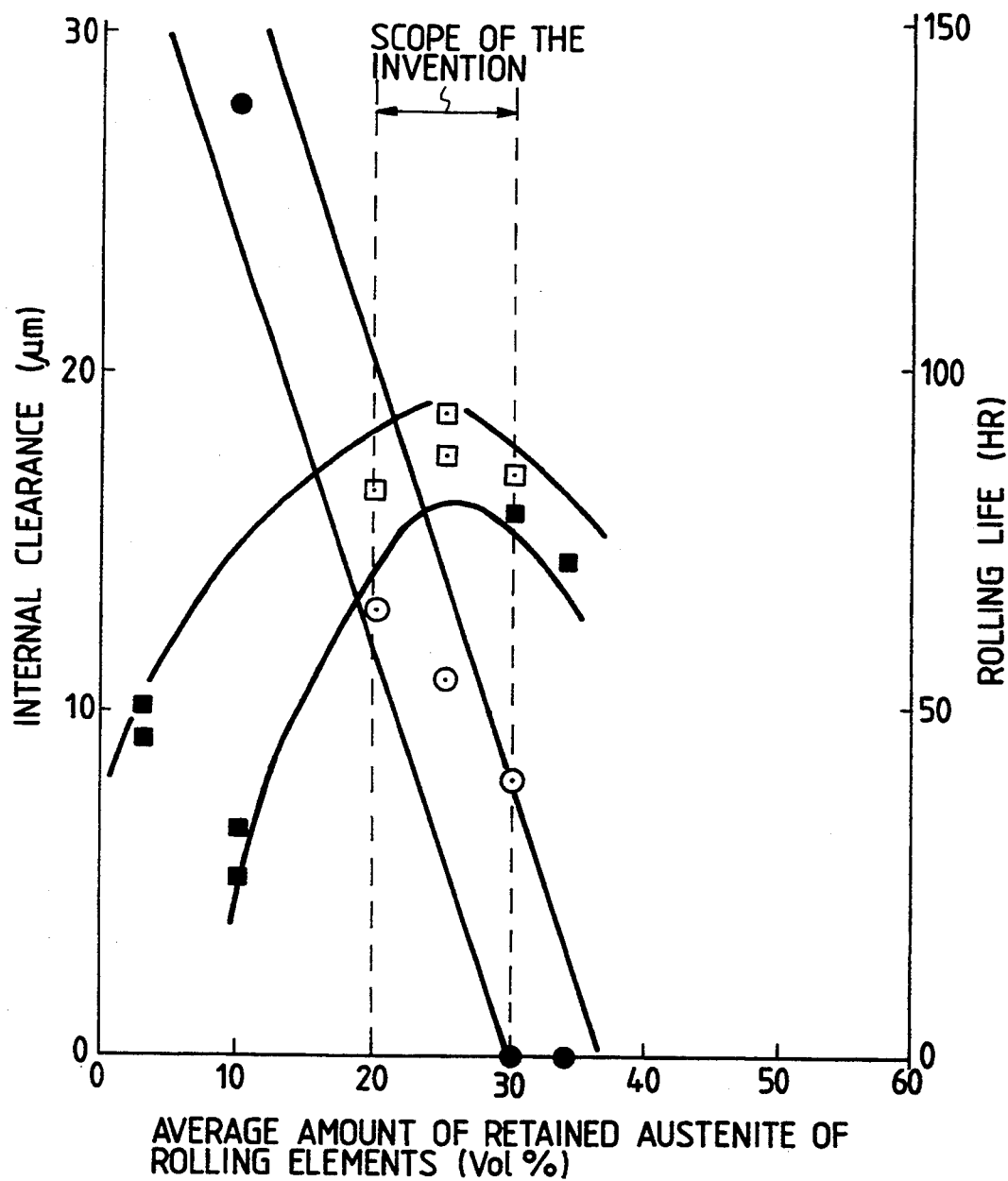
FIG. 6 is a graph showing a relationship of the average amount of the retained austenite of the rolling elements with the internal clearance and the rolling life in the examples of the present invention.

The data thus obtained were arranged in FIGS. 5 and 6. FIG. 5 shows a relationship of the average amount of the retained austenite of the inner ring with the inner diameter. FIG. 6 shows a relationship of the average amount of the retained austenite of the rolling elements with the internal clearance and the rolling life.

In the foregoing examples, though the steel A was subjected to a carbonitriding treatment, it may be replaced with a carburizing treatment (e.g., heating temperature 920° to 950° C., heating time 3 hours).

Furthermore, with respect to the rolling elements, it would be needless to say that the present invention is applicable not only to balls but also to various rollers used in various roller bearings.

As described above in detail, according to the present invention, a rolling bearing capable of maintaining both the good dimensional stability and the long rolling life under the conditions of a high temperature and the existence of foreign matters intermixed in the lubricant in the bearing.

While the invention has been described in detail and with reference to specific embodiments thereof, it will be apparent to one skilled in the art that various changes and modifications can be made therein without departing from the spirit and scope thereof.

What is claimed is:

1. A rolling bearing comprising an inner ring, an outer ring, and rolling elements each composed of an alloy steel which (a) are, after being subjected to one of a carburizing treatment or a carbonitriding treatment then subjected to quench-hardening and tempering or (b) are subjected to quench-hardening and tempering, wherein the alloy steel contains from 0.10 to 1.00% by weight C, from 0.50 to 3.00% by weight Cr, from 0.15 to 1.00% by weight Si, from 0.2 to 1.50% by weight Mn, and rest being Fe and unavoidably intermixed impurities, the average amount of the retained austenite of at least the inner ring is not more than 4% by volume and the average amount of the retained austenite of the rolling elements is from 20 to 30% by volume.

2. A rolling bearing as claimed in claim 1, wherein at least said inner ring contains from 0.10 to 0.80% by weight C and at least said inner ring is, after being subjected to a carburizing treatment or a carbonitriding treatment, subjected to quench-hardening and high-temperature tempering.

3. A rolling bearing as claimed in claim 1, wherein said rolling elements contain 0.80 to 1.00% by weight C and said rolling elements are subjected to quench-hardening and tempering.

4. A rolling bearing as claimed in claims 1 to 3, wherein the alloy further contains Mo in an amount of not more than 2.00% by weight and Ni in an amount of not more than 1.00% by weight.

5. A rolling bearing as claimed in claims 1 to 3, wherein the retained austenite amount in the surface layer portion of the rolling elements is from 20 to 45% by volume.

* * * * *